(12) United States Patent
Hastrich

(10) Patent No.: US 7,320,460 B1
(45) Date of Patent: Jan. 22, 2008

(54) REAR-END STAND

(76) Inventor: Robert Andrew Hastrich, 177 Main St., Akron, NY (US) 14001

( * ) Notice: Subject to any disclaimer, the term of this patent is extended or adjusted under 35 U.S.C. 154(b) by 0 days.

(21) Appl. No.: 11/515,190

(22) Filed: Sep. 5, 2006

(51) Int. Cl.
*B23Q 3/00* (2006.01)

(52) U.S. Cl. .................. 269/296; 254/133 R; 254/134

(58) Field of Classification Search ............... 254/134, 254/133 R, 8 R, 120; 269/296
See application file for complete search history.

(56) References Cited

U.S. PATENT DOCUMENTS

| | | | | |
|---|---|---|---|---|
| 4,324,384 A | * | 4/1982 | Elser | 254/8 B |
| 4,723,756 A | * | 2/1988 | Stumpf, Jr. | 254/93 H |
| 5,211,376 A | * | 5/1993 | Anderson | 254/134 |
| 5,271,603 A | * | 12/1993 | White | 254/10 C |
| 6,193,078 B1 | * | 2/2001 | Stuhlmacher | 211/20 |

* cited by examiner

*Primary Examiner*—Lee D. Wilson

(57) ABSTRACT

This is stand that holds the rear end to an automobile. This stand allows you to turn the rear axle in any angle and hold that position to freely work on it. You can set up gears, clean the rear axle, weld it, drain oil from it, etc. This stand prevents you from having to chase the rear axle around on the garage floor and prevents you from having to keep hunched over.

3 Claims, 2 Drawing Sheets

REAR-END STAND

BRIEF SUMMARY

1. Field of Invention

The instant application relates to a stand for an automobile axle.

2. Background of the Invention

I have a 1977 Oldsmobile Omega that I have been building. I was in the process of building the rear axle. I had the rear axle shipped to my home and had also purchased a limited-slip differential and 4:11 gears. I began to try to setup the 4:11 gears into the rear axle and this was the first time I have done this. I had the rear axle on my work bench and it would not sit still so I could check the backlash on the gears.

After getting mad with chasing the axle around the bench, I went in the house and designed a stand on paper.

SUMMARY OF THE INVENTION

I designed the stand and developed a working model. Later, I grabbed some 1×3 box tubing, my welder and my band-saw. I began to cut different miters on the tubing to find out what the perfect angle would be on the legs. I came upwith a 60 degree cut on both pipes to have the fight angle on the legs. Cutting the legs at 25" high and having the upright bars at 14", the total height is 41" with the casters. This way you don't have to bend over to work on it and have stress on your back. The 1×3 tubing is a 0.83 wall which is plenty strong enough for a car's rear axle. If I increase the wall size of the tubing, it would hold the rear axle to a tractor trailer.

The clamps that I have on my stand are vice-grip pipe clamps that will fit over a standard 3" rear axle housing. Having the clamps on top of the 14" tubes allows it to hold the rear axle in any angle to work on it. For an example, to check the backlash you have to have a zero degree pinion angle straight down.

Another example, to remove the pinion gear, you need a 90 degree pinion angle straight out. The rear end stand will hold the rear axle in any angle you need to work on it.

The instant invention is designed to address all of these problems.

DETAILED DESCRIPTION

DETAILED DESCRIPTION OF THE INVENTION

Figure 1:
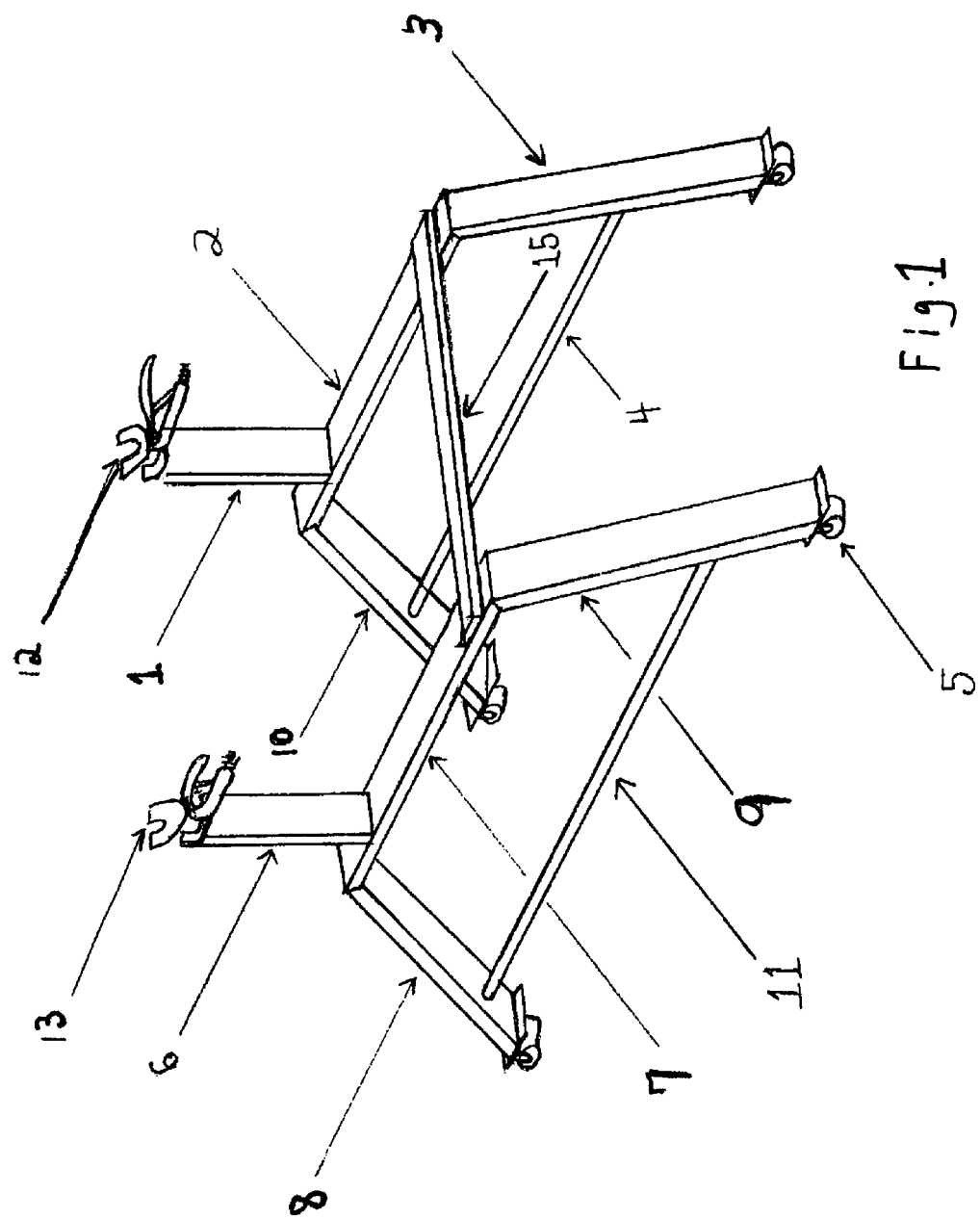
FIG. 1 showing a sketch of the rear-end stand.
Figure 2:
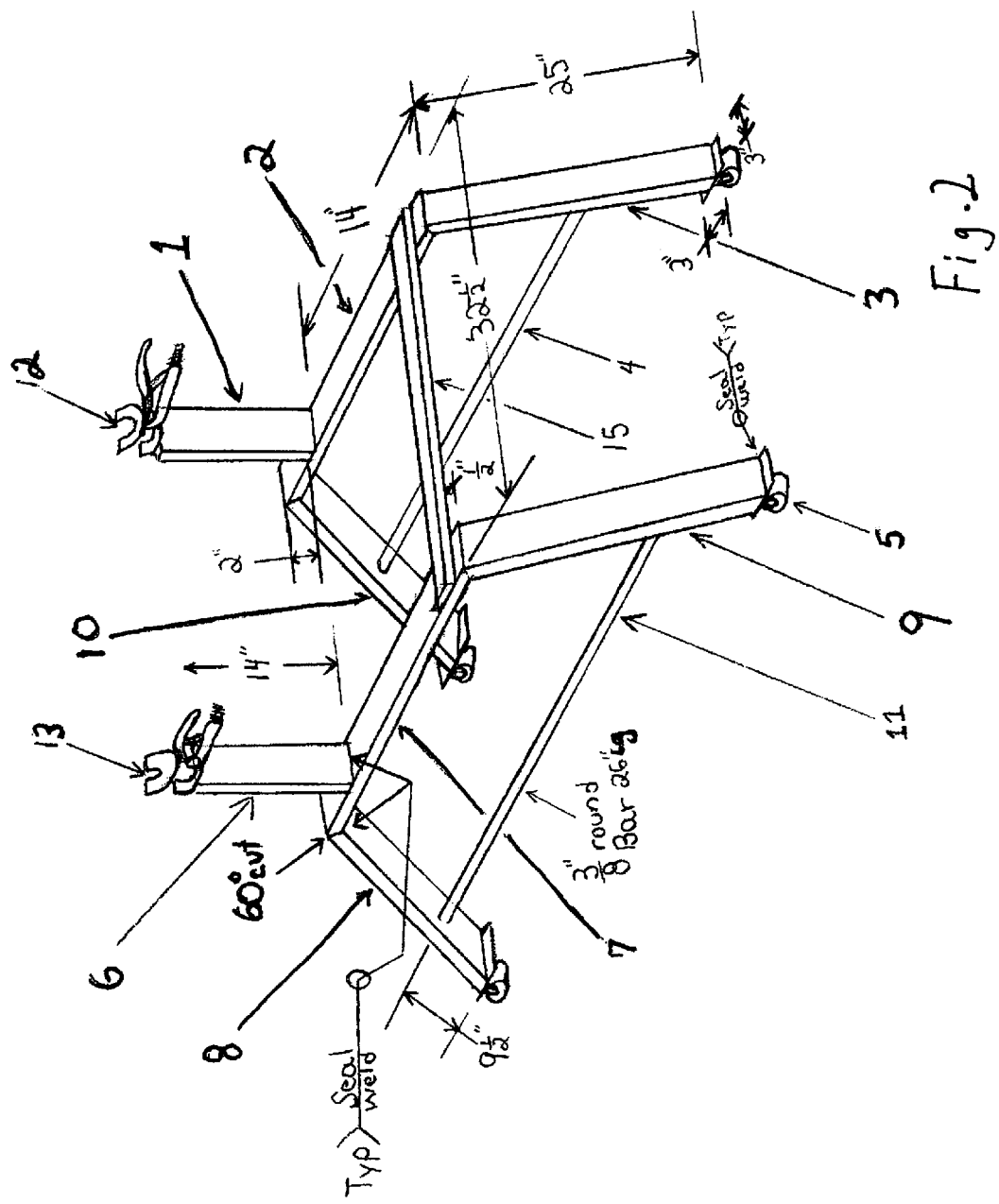
FIG. 2 showing a sketch of the rear-end stand with the dimensions and weld symbols. Note: TYP means typical.

Tools Needed: (1) $7/16$ wrench, (2) $9/16$ wrenches, (1) flat head screwdriver

Step 1: Put both legs apart. One leg will have a "L" for left and the cross bar will have a "L" for left, stamped on the pieces.

Step 2: Put cross bar in place with bolts. Do not tighten bolts.

Step 3: Place something round (such as a drive-shaft), in the clamps. It has to be straight. Clamp down on your bar to straighten the two legs out. Tighten the bolts. You'll need the $9/16$ wrenches.

Step 4: Flip stand over and proceed to put casters on legs with the $7/16$ wrench and the flat head screwdriver.

Your stand will be complete. Do not exceed 500 pounds maximum. See FIGS. 3A, 3B, 4A and 4B.

The following invention has two front legs 3 and 9, two straight bars 2 and 7, two rear legs 8 and 10, two upright bars 1 and 6, four casters wheels 5, two round bars 4 and 11, a cross bar 15, vise grips 12 and 13 with elongated U-shaped jaws. The vise grips having two handles with an adjustment screw. The vise grips are welded to the uptight bars.

The invention claimed is:

1. A stand for a vehicle comprising: a base having two front legs with first and second ends; angularly connected to a first end of two straight bars and a second end connected to two rear bars; and two up right bars extending upright from said straight bars; said upright bars comprising: two u-shaped jaws including two handles with an adjustment screw, said u-shaped jaws fixedly attached to said upright; and a cross bar connecting said straight bar members wherein said cross bar is perpendicular to said straight bars.

2. The stand of claim 1, wherein a round bar is connected to said front and rear bars.

3. The stand of claim 1, wherein wheels are attached to second ends of the front and rear bars.

* * * * *